(12) United States Patent
Nakanishi

(10) Patent No.: US 6,603,457 B1
(45) Date of Patent: Aug. 5, 2003

(54) DISPLAY DEVICE WITH MOVING PIXEL MEMBERS

(75) Inventor: Masahiro Nakanishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 09/598,408

(22) Filed: Jun. 21, 2000

(30) Foreign Application Priority Data

Jun. 23, 1999  (JP) .............................................. 11-177353

(51) Int. Cl.⁷ ................................................. G09G 3/34
(52) U.S. Cl. ....................... 345/107; 345/111; 345/108; 345/85; 345/110; 345/105; 345/106; 359/296
(58) Field of Search .............................. 345/30, 31, 33, 345/84, 85, 86, 108–109, 107, 110, 111; 359/296; 340/815.62, 815.64, 815.86, 815.87; 40/447, 471–480

(56) References Cited

U.S. PATENT DOCUMENTS

| | | | | |
|---|---|---|---|---|
| 3,267,595 A | * | 8/1966 | Levy et al. ............ | 340/815.62 |
| 3,685,040 A | * | 8/1972 | Hart ........................... | 345/109 |
| 4,110,922 A | * | 9/1978 | Leemann-Dittmann ..... | 345/110 |
| 4,761,905 A | * | 8/1988 | Black ..................... | 340/815.53 |
| 5,904,790 A | * | 5/1999 | Sheridon ..................... | 156/83 |
| 6,166,848 A | * | 12/2000 | Commenga et al. ........ | 359/267 |
| 6,222,519 B1 | * | 4/2001 | Harris ........................ | 345/107 |
| 6,262,707 B1 | * | 7/2001 | Sheridon .................... | 345/111 |
| 6,327,072 B1 | * | 12/2001 | Comiskey et al. .......... | 359/296 |
| 6,348,908 B1 | * | 2/2002 | Richley et al. ............... | 345/85 |

FOREIGN PATENT DOCUMENTS

JP            6-266299         *    9/1994

* cited by examiner

Primary Examiner—Steven Saras
Assistant Examiner—Amr Awad
(74) Attorney, Agent, or Firm—Fitzpatrick, Cella, Harper & Scinto

(57) ABSTRACT

A display device having much fewer drive electrodes than expected by the number of pixels is formed by including a plurality of pixel members, an endless guide holding the plurality of pixel members movably therein, a pixel member mover disposed at a part of the guide for moving the pixel members along the guide, and a pixel member color changer disposed at a part of the guide for causing a color change of individual pixel members. The colors of respective pixel members are changed by the pixel member color changer while the respective pixel members are moved by the pixel member mover to effect a display.

11 Claims, 12 Drawing Sheets

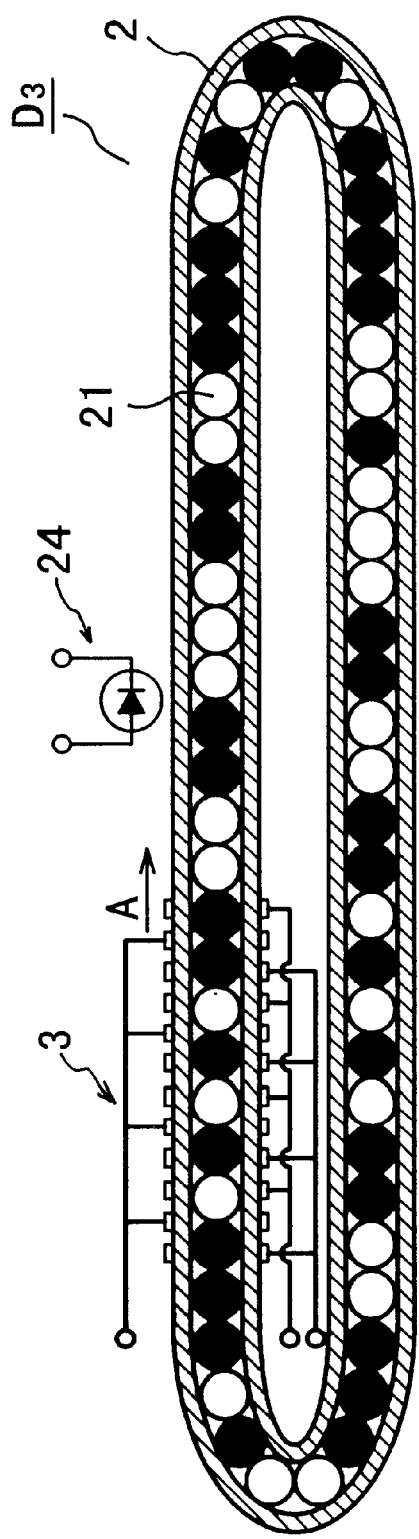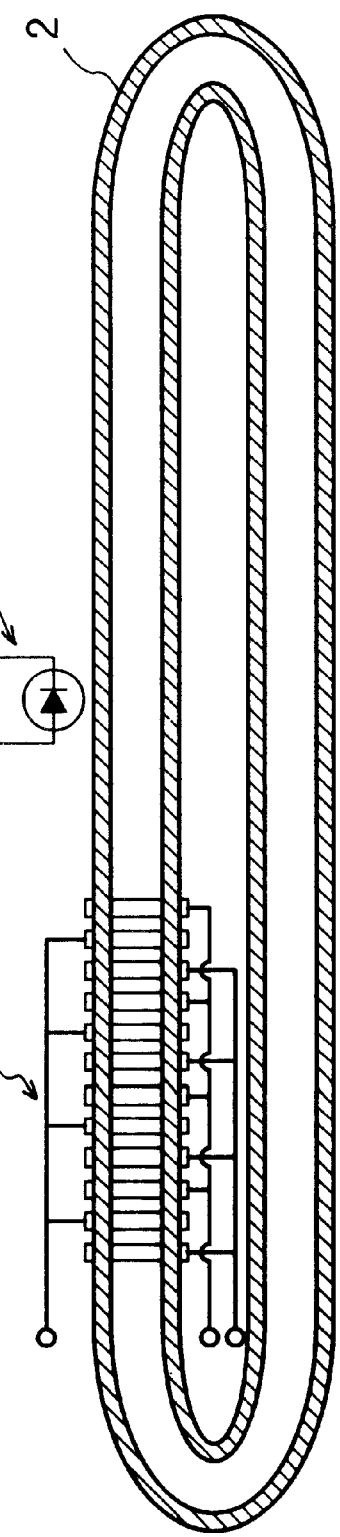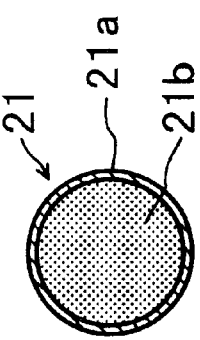
FIG. 3A
FIG. 3B
FIG. 3C

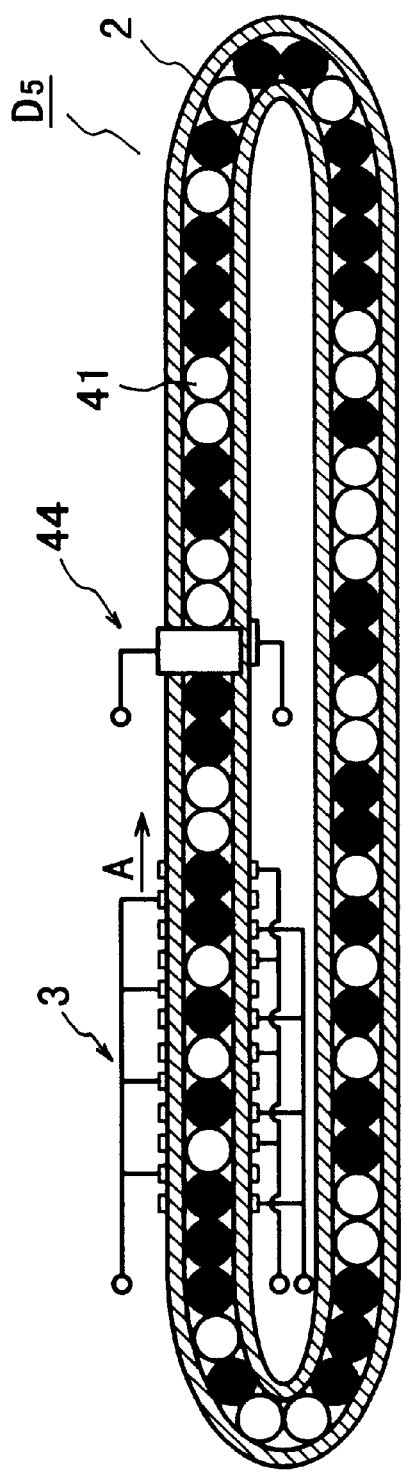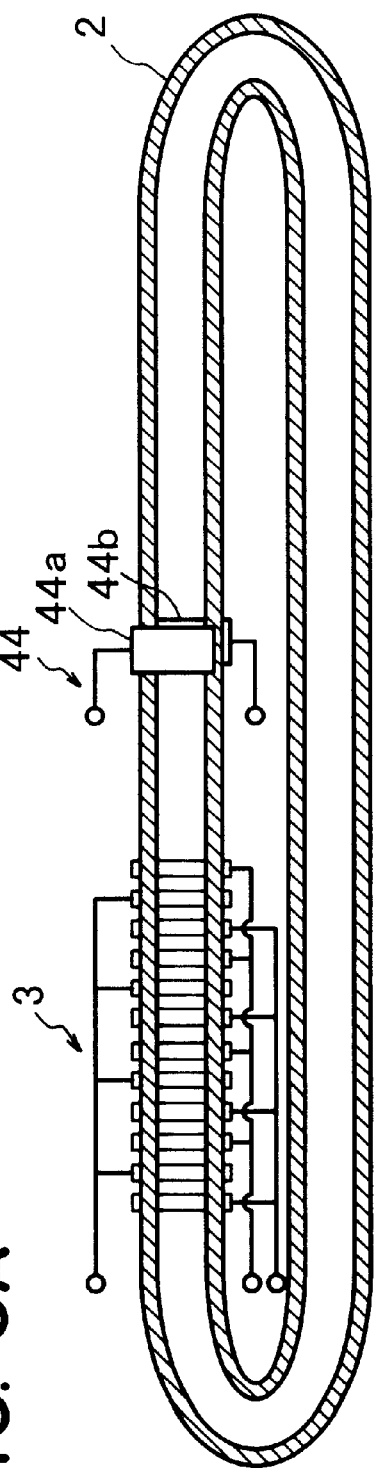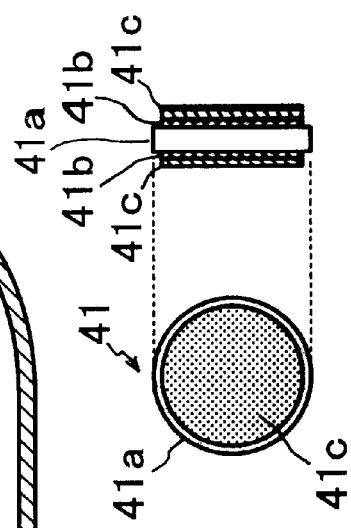
FIG. 5A
FIG. 5B
FIG. 5C

DISPLAY DEVICE WITH MOVING PIXEL MEMBERS

FIELD OF THE INVENTION AND RELATED ART

The present invention relates to a display device wherein pixel members are moved along a guide means while causing color change to effect a data display.

A display device, particularly flat panel display devices, are used for various appliances inclusive of computers, and the importance thereof has been increasing in recent years.

Various types of display devices are known, inclusive of, e.g., liquid crystal display devices, electroluminescence display devices, plasma display devices, electrochromic display devices and electrophoretic display devices, and research and development work thereon and commercialization thereof are being extensively conducted.

However, in the above-mentioned types of display devices, each pixel has to be equipped with one or more electrodes for electrical addressing, so that a display device having a larger number of (matrix) pixels requires an increasingly larger number of (matrix) electrodes. As a result, the wiring or disposition of the electrodes becomes complicated to result in an increased production cost, and a larger number of parts are required to also result in an increased production cost.

Further, as takeout or lead electrodes for such a large number of matrix electrodes are usually disposed along plural edges of a display device owing to the number thereof and resistances of the matrix electrodes, it has been difficult to bind a plurality of such display devices in sheet form along one edge thereof to provide a book-form display apparatus wherein individual sheet display devices can be observed by turning sheet by sheet.

SUMMARY OF THE INVENTION

Accordingly, an object of the present invention is to provide a display device capable of obviating difficult electrode arrangement and an increase in production cost.

Another object of the present invention is to provide a book-form display apparatus formed by binding a plurality of such display devices in sheet form along an edge thereof.

According to the present invention, there is provided a display device, comprising:
  a plurality of pixel members,
  an endless guide means holding the plurality of pixel members movably therein,
  a pixel member-moving means disposed at a part of the guide means for moving the pixel members along the guide means, and
  a pixel member color-changing means disposed at a part of the guide means for causing a color change of individual pixel members,
so that the colors of respective pixel members are changed by the pixel member color-changing means while being moved by the pixel member-moving means to effect a display.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 to 5 illustrate first to fifth embodiments of the display device according to the invention, including:

FIGS. 1A, 2A, 3A, 4A and 5A each illustrating a sectional view in an operating state;

FIGS. 1B, 2B, 3B, 4B and 5B each illustrating an intermediate state of production; and FIGS. 1C, 2C, 3C, 4C and 5C each illustrating a front view or/and a sectional (or side) view of a pixel member used in an embodiment.

DESCRIPTION OF THE PREFERRED EMBODIMENTS

FIGS. 1 to 5 each illustrate an embodiment of the display device according to the present invention.

Figure 1A:
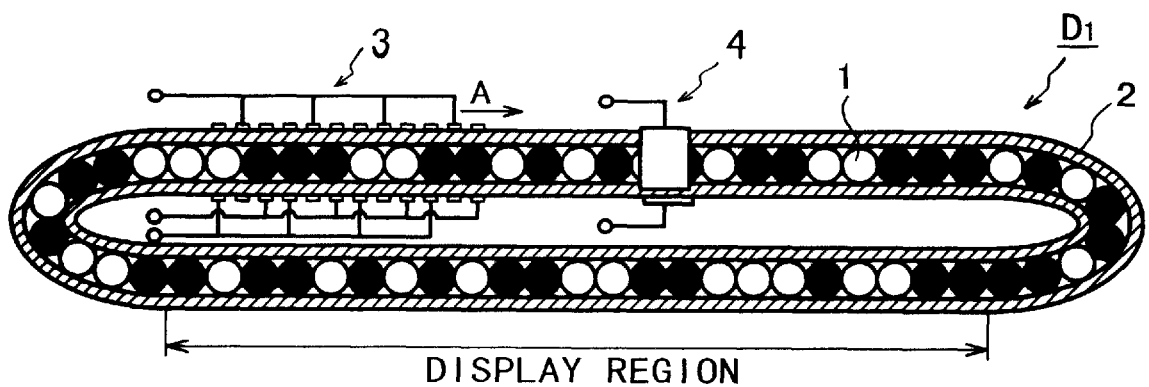

As shown in, e.g., FIG. 1A which is a cross-sectional view of a display device D1 according to an embodiment of the present invention, the display device D1 includes a plurality of pixel members 1, an endless guide means 2 holding the pixel members 1 movably therein, a pixel member-moving means 3 disposed at a part of the guide means 2 for moving the pixel members 1 along the guide means 2, and a pixel member color-changing means 4 disposed at a part of the guide means 2 for changing colors of individual pixel members 1.

The term "endless" means that the guide means 2 has a shape of loop having no definite terminals, within and through which the pixel members 1 can been moved circulatively.

Figure 1B:
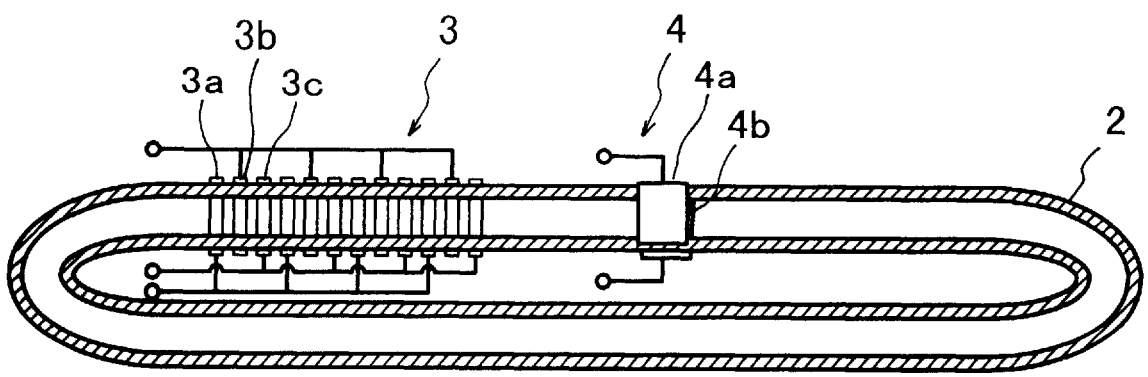
Figure 1C:
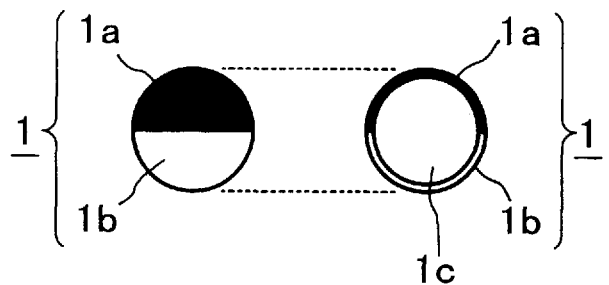

The pixel members 1 (or 11, 21, . . . shown in subsequent figures) may for example assume any one of the following forms:

(1) A sphere or ball 1 having two surface regions 1a and 1b having mutually different permittivities (or dielectric constants) and colors as shown in FIG. 1C (including a front view on the left and a sectional view on the right). This may be termed a twisting ball 1.

Figure 2A:
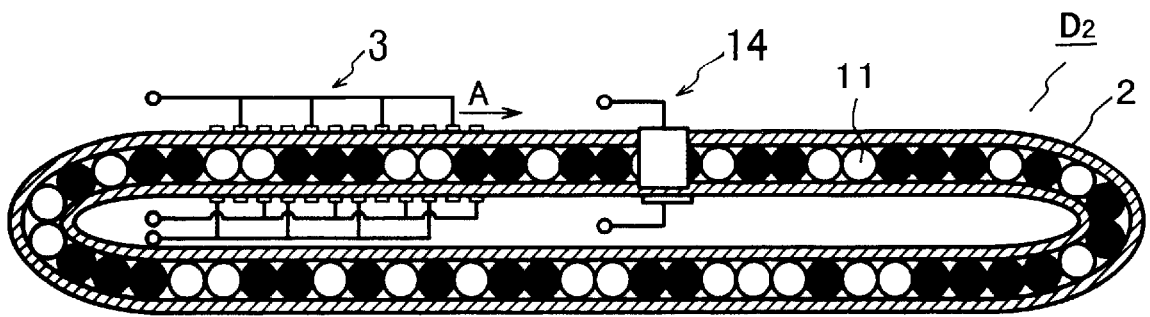
Figure 2B:
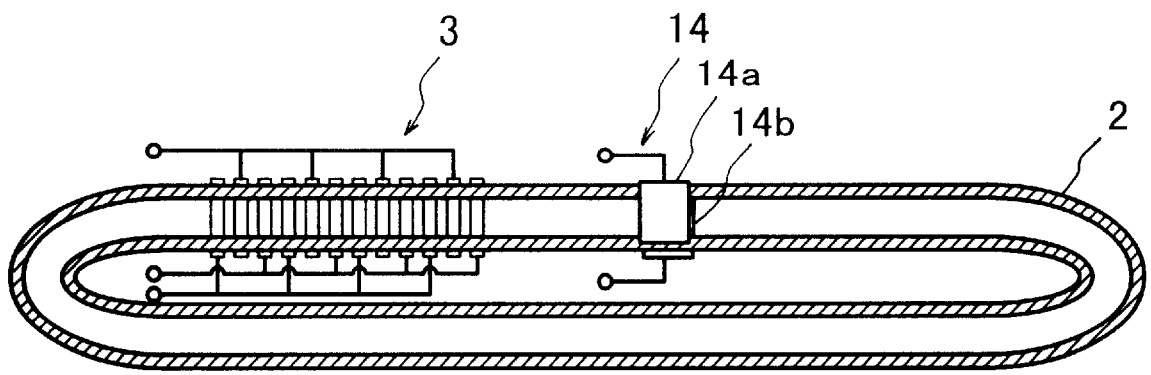
Figure 2C:
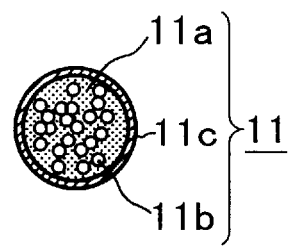

(2) A microcapsule 11 formed by enclosing a colored dispersion medium 11a and electrophoretic particles 11b within a capsule wall 11c as shown in FIG. 2C. This may be termed an electrophoretic microcapsule 11.

(3) A microcapsule (not specifically shown) formed by enclosing a colored dispersion medium and magnetophoretic particles (i.e., particles migrating under the action of a magnetic field) within a capsule wall. This may be termed a magnetophoretic microcapsule.

(4) A bead 21 formed by coating a core 21b with a photochromic material 21a as shown in FIG. 3C. This may be terms as a photochromic bead 21.

Figure 4A:
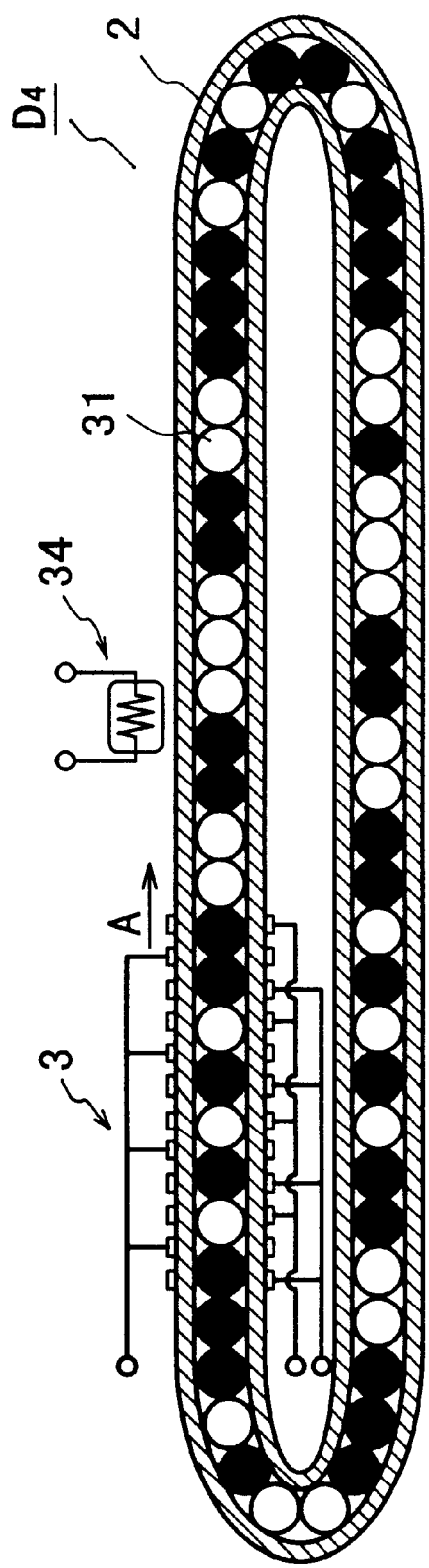
Figure 4B:
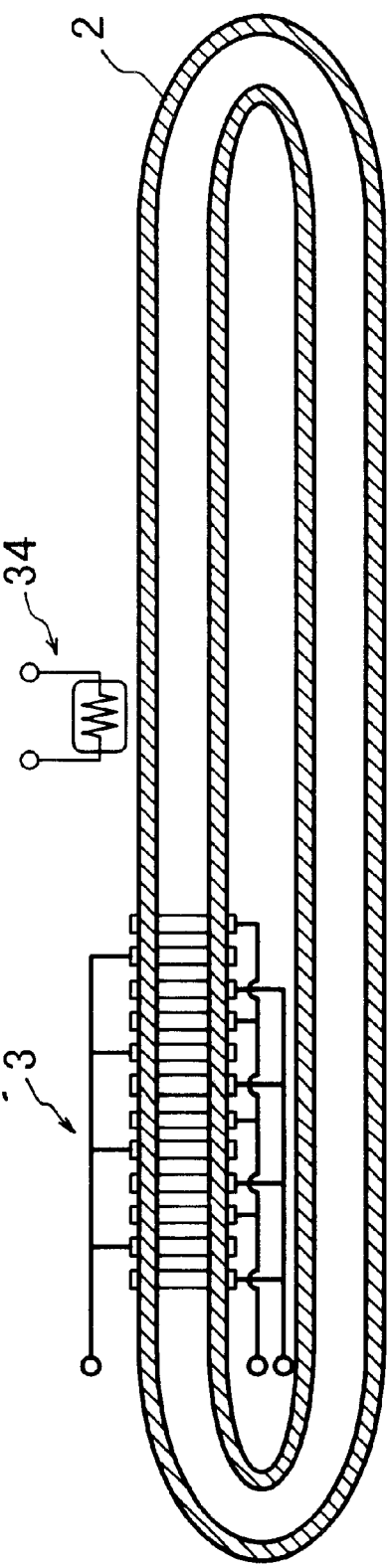
Figure 4C:
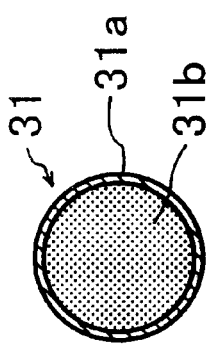

(5) A bead 31 formed by coating a core 31b with a thermochromic material 31a as shown in FIG. 4C. This may be termed a thermochromic bead 31.

Figure 6:
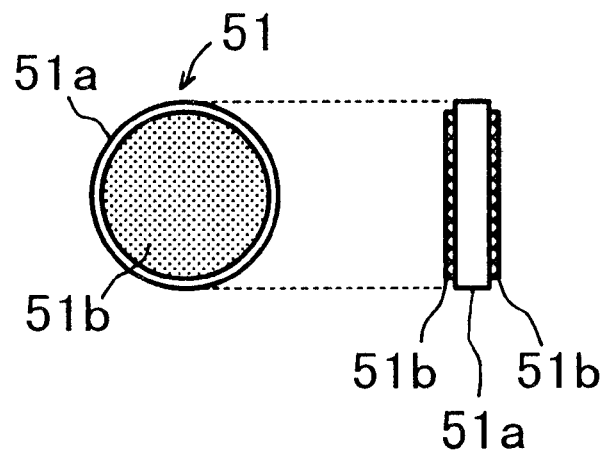
FIG. 6 illustrates a front view and a side view of an electrochromic tablet also usable in the fifth embodiment.

(6) Electrochromic cells 41 and 51 as shown in FIGS. 5C and 6 (each showing a front view on the left and side on the right).

The pixel members 1, 11, 21, 31, 41 and 51 described above may have any shapes but may preferably be spherical or disk-shaped. Further, these pixel members may preferably be disposed without a substantial spacing therebetween within the guide means 2 but can retain a spacing within an extent not obstructing the movement thereof by the pixel member-moving means 3.

In the display device D1 using twisting balls 1, shown in FIG. 1A, the twisting balls 1 have to be held rotatably within the guide means 2. A twisting ball 1 as shown in FIG. 1C having two surface regions 1a and 1b having mutually different permittivities and colors may be formed by coating a core material 1c with two materials having mutually different permittivities and colors, e.g., a combination of a white material, such as zirconium oxide, and a black material, such as titanium carbide, for a white-and-black display. For a color display, the titanium carbide may be replaced with colored materials, such as ruthenium oxide.

On the other hand, the above pixel member color-changing means 4 are required to move the pixel members according to different mechanisms depending on the material of the pixel materials as follows.

(1A) In the display device D1 using twisting balls 1 as described in (1) above as pixel members the pixel member color-changing means 4 comprises a pair of electrodes 4a and 4b disposed opposite to each other so as to face the guide means 2 for applying voltages of different polarities for rotating the twisting balls 1 under control as shown in FIGS. 1A and 1B depending on the polarities of applied voltages. The electrode(s) may be called twisting ball-rotating electrode(s).

(2A) In a display device D2 using electrophoretic microcapsules 11 as pixel members as described in (2) above, the pixel member color-changing means 14 comprises a pair of electrodes 14a and 14b disposed opposite to each other so as to face the guide means 2 for changing the relative position of accumulation of the electrophoretic particles 11b within the capsule 11 depending on the polarity of applied voltage as shown in FIGS. 2A and 2B.

(3A) In the case of using magnetophoretic microcapsules as described in (3) above as pixel members, the pixel member color-changing means may comprise a pair of electrodes disposed opposite to each other so as to face the guide means for changing the position of accumulation of magnetophoretic particles within the microcapsule depending on the polarity of applied voltages.

(4A) In a display device D3 using photochromic beads 21 mentioned in (4) above as pixel members, the pixel member color-changing means comprises a light source 24 for illuminating the photochromic beads 21 so as to induce a photochromic phenomenon thereof.

(5A) In a display device D4 using thermochromic beads 31 as described in (5) above as pixel members, the pixel member color-changing means comprises a heating device 34 disposed to face the guide means 2 for heating the thermochromic beads to cause a thermochromic phenomenon as shown in FIGS. 4A and 4B.

(6A) In a display device D4 using electrochromic cells 41 (or 51) as described in (6) above as pixel members, the pixel member color-changing means may comprise a pair of electrodes 44a and 44b disposed opposite to each other so as to face the guide means 2 for applying voltages to the electrochromic cells 41 (or 51) so as to cause color-changing oxidation/reduction reactions.

On the other hand, the pixel member-moving means 3 may comprise one or more units of juxtaposed electrodes as shown in FIGS. 1 to 5 or a piezoelectric film (not shown) disposed along the guide means 2. When juxtaposed electrodes 3 are used, voltages may be sequentially applied to respective electrodes so as to generate an electrostatic attractive force (or repulsive force), or magnetic attractive force (or repulsive force) acting between the pixel members 1 (11, 21, . . . ) and the respective electrodes 3, therby moving the pixel members 1 under the action of such forces acting at places which move along the guide means 2. In case where the electrodes 3 are divided into three groups as shown in, e.g., FIGS. 1A and 1B, the respective electrodes 3 may be sequentially supplied with three-phase alternative voltages having three phases shifted by 120 deg. each. If the electrodes 3 are divided in a larger number (n>4) of groups, the respective electrodes 3 may be supplied with a multi-phase alternating voltages having the number (n) of phases. On the other hand, in the case of using a piezoelectric film, the piezoelectric film may be supplied with locally varying voltages so as a to generate a surface elastic wave by which the pixel members are moved along the guide member 2.

The guide member 2 may assume a shape of a groove or a tube. In the guide member 2, a lubricant, such as silicone oil may preferably be contained in addition to the pixel members 1 so as to facilitate the movement of the pixel members.

Figure 7:
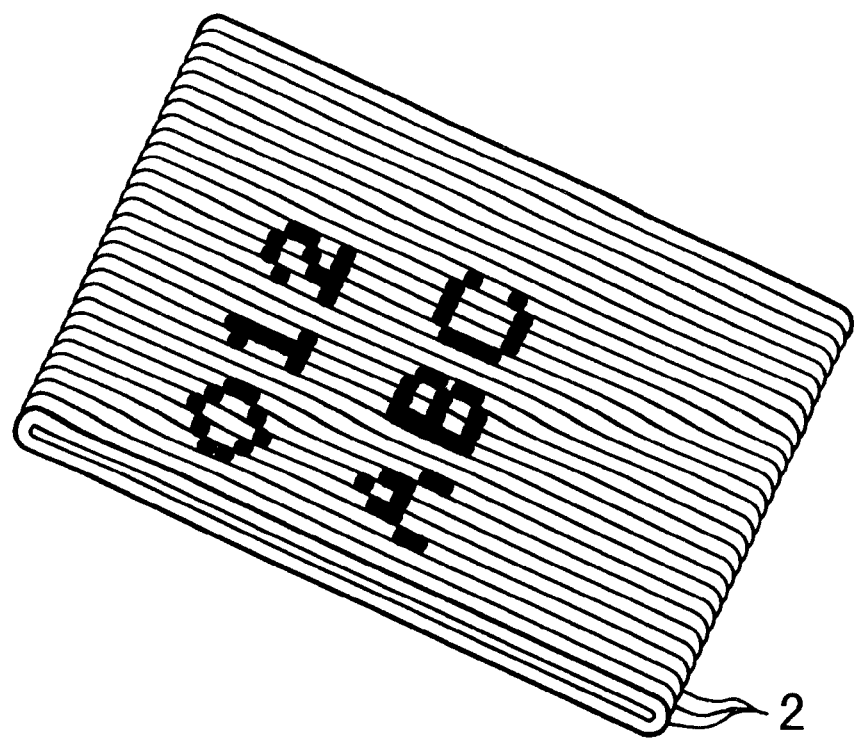
FIG. 7 is a perspective view of a sheet form display device formed by combining a plurality of display devices as shown in previous figures.

A display device may comprise one or more guide means 2 but may preferably comprise a plurality of guide means 2 disposed adjacent to each other so as to form a display picture area as shown in FIG. 7. In this case, the pixel member-moving means 3 and the pixel member color-changing means 4 may be provided to each guide means 2. One pixel member-moving means 3 can be provided in common to a certain plurality of guide means 2, while one pixel member color-changing means 4 should preferably be provided to each guide means 2 so as to allow an independent drive of the respective guide means 2. For an ordinary display, the pixel members 1 may preferably be moved at an identical speed for all the guide means 2. This is for example accomplished by applying identical three-phase alternating voltages to all the guide means 2.

The display device in a generally sheet form as shown in FIG. 2 may be provided in a number of 2, and two sheets of display devices may be superposed back to back so as to provide a stacked device capable of display on both surfaces. Further, it is possible to provide a book-form-display apparatus allowing sheet-by-sheet observation by turning sheet by sheet by superposing or stacking a plurality of such two-face display devices or sheet-like display devices as shown in FIG. 7 and binding the superposition or stack of display devices along an edge thereof.

Figure 13A:
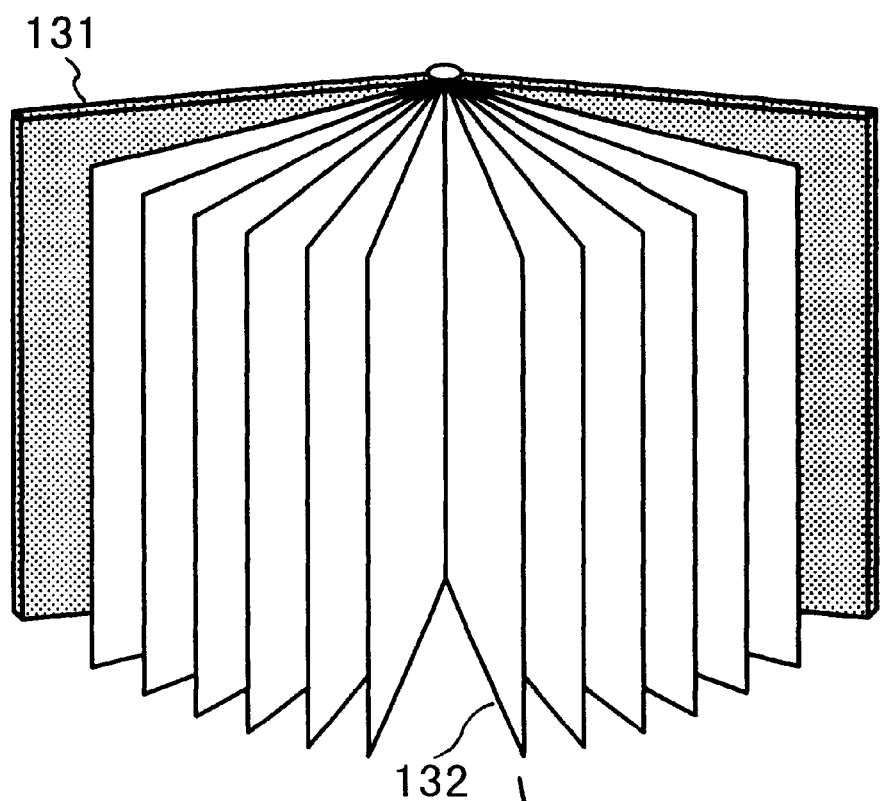
FIG. 13A illustrates an example of a book-form display apparatus.
Figure 13B:
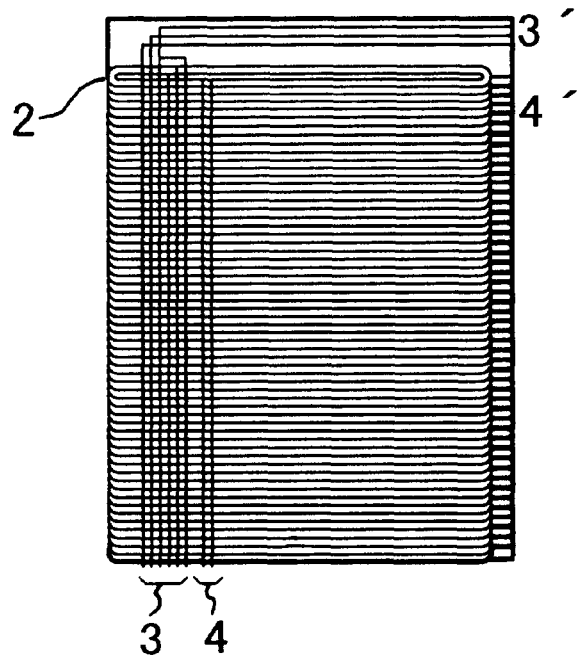
FIG. 13B illustrates a sheet-form display device included as a page display device contained therein together with an electrode arrangement thereon.

An example of such a book-form display apparatus is illustrated in FIG. 13A. Referring to FIG. 13A, a book-form display apparatus D6 includes a cover sheet device 131 of an e.g., 5 mm-thick hollow box-forming which a power supply battery, a DC-DC inverter for generating a higher voltage, a memory, a logic circuit, etc., are enclosed, and a plurality of sheet-form display devices 132 stacked with each other and each similar to one illustrated in FIG. 7 and more specifically comprising a plurality of guide members 2 (each constituting a tubular or linear display device as shown in FIGS. 1A –1C) as shown in FIG. 13B. Each sheet form device includes a plurality of pixel member-moving electrodes 3 (3a, 3b, 3c) which are disposed at a part along an edge of the sheet-form display device 132 and are driven to commonly move the pixel members within each of the plurality of guides 2 based on common signals supplied through lead electrodes 3' disposed at an end of the sheet-form display device 132, and also a pair of pixel member color-changing electrodes 4 which are supplied with independently controlled color-changing signals for respectively associated guides 2 (linear display device) supplied through lead electrodes 4' disposed along an edge of the sheet-form display device.

The above-described display devices may be driven in a manner as described below with respect to the device shown in FIG. 1.

When the pixel member-moving means 3 is operated, the pixel members 1 in the neighborhood of the moving means 3 are moved in an indicated arrow A direction within and along the guide means 2, whereby the other pixel members 1 are pushed by the moving pixel members 1 to be moved. As a result, all the pixel members 1 in the guide means 2 are moved in circulation within the endless guide means 2.

In this state, the respective moving pixel members 1 are sequentially and individually subjected to a color changing operation as mentioned above when they pass by the pixel member color-changing means 4 (14, 24, 34 or 44).

Each sheet-form display device 132 of the book-form display apparatus shown in FIGS. 13A and 13B may be driven according to a sequence including the following steps.

(1) A certain display page (sheet-form display device) 132 is selected for rewriting.

(2) Pixel members 1 in the respective guides 2 are moved by a distance of one pixel member size (e.g., 100 $\mu$m) by actuation of pixel member-moving electrodes 3.

(3) Pixel member color-changing electrodes 4 are driven for the respective guides 2 to select appropriate colors (white or black) of the pixel members concerned at the respective guides 2.

(4) The steps (2) and (3) are repeated until a required rewriting is completed on the selected sheet-form display device 132.

As described above, in the display device including movable pixel members, each pixel (member) need not be provided with drive electrodes as in a conventional display device, so that the member of drive electrodes can be reduced, and correspondingly it becomes possible to alleviate the complexity of electrode arrangement and cost increase accompanying it.

Further, as the number of drive electrodes and accompanying drive parts can be reduced, the display device can be formed in a small thickness so that a book-form display apparatus as mentioned above can be formed by stacking a plurality of such display devices.

Further, as each pixel member does not require a drive electrode and the entire structure is simple, the display device can be constituted as a flexible display device by forming the guide means of a flexible material, such as a plastic material.

Hereinbelow, the present invention will be described based on specific examples.

EXAMPLE 1

A display device D1 shown in FIGS. 1A–1C was prepared.

More specifically, the pixel members comprised twisting balls 1 as shown in FIG. 1C, and the pixel member color-changing means 4 comprised a pair of twisting ball-rotating electrodes 4a and 4b disposed to sandwich the guide means 2. The pixel member-moving means 3 comprised three conveyer electrode groups 3a, 3b and 3c disposed perpendicular to the guide means 2 for generating an electrostatic attraction force (or repulsion force) acting between the pixel members 1 and the electrodes 3a, 3b and 3c so as to move the pixel members 1. The electrodes in each group 3a, 3b or 3c were disposed at a pitch of 100 $\mu$m.

For the production of twisting balls 1 as shown in FIG. 1C, a plurality of 100 $\mu$m-dia. core zirconia (zirconium oxide) balls 1c were half-embedded within wax 1b, and exposed hemispheres of the zirconia balls 1c were respectively coated with a ca. 1 $\mu$m-thick black and electroconductive layer of titanium carbide by RF-magnetron sputtering. Then, the balls were taken out from the wax to provide twisting balls 1 each having a structure as shown in FIG. 1C.

Separately, on one surface (corresponding to an outer surface of guide means 2 formed later) of a PET (polyethylene terephthalate) film forming a wall of guide means 2, a portion (substantially a half) of conveyer electrodes 3 and a rotating electrode 4b were formed. More specifically, the outer surface of the PET film was coated with a 5 $\mu$m-thick vapor-deposited Al film, which was then patterned by etching into a group of 17 $\mu$m-wide stripe electrodes (3a, 3b an 3c in FIG. 1B) at a pitch of 34 $\mu$m as conveyer electrodes and a 30 $\mu$m-wide electrode 4b (in FIG. 1B) as a rotating electrode (having a length of 140 $\mu$m for each guide 2). The electrodes (3a, 3b and 3c) were grouped in three electrode groups 3a, 3b and 3c, and divided into 4 units each including one electrode 3a, one electrode 3b and one electrode 3c. The electrodes of each group were connected in common and electrically isolated from the other groups as shown in FIG. 1B.

Then, on the other surface of the PET film, a 110 $\mu$m-thick layer of negative photoresist ("THB-130N", available from JSR K.K.) was applied, exposed through a photomask and developed to form side walls 2 (of guide means 2) in the form of two parallel loops each having a width of 30 $\mu$m and a height of 110 $\mu$m with a spacing of 110 $\mu$m therebetween so as to provide a display region in a length of ca. 10 cm (FIG. 1A). The structure thus-formed was similar to the one shown in FIG. 1B (except that a counter rotating electrode 4a was not yet formed).

Then, the above-prepared twisting balls 1 were mixed in a weight ratio of 1:1 to 1.5: with silicone oil containing 0.1 wt. % of sodium alkylsulfosuccinate, and the mixture was then sprayed over the region defined by the side walls 2 of the above-formed structure (substantially shown in FIG. 1B). Then, another PET film having a counter rotating electrode 4a was applied as a ceiling film in alignment with the electrode 4b and bonded to the guide walls 2. The twisting balls 1 outside the guide walls 2 were removed by washing with silicone oil.

Figure 8:
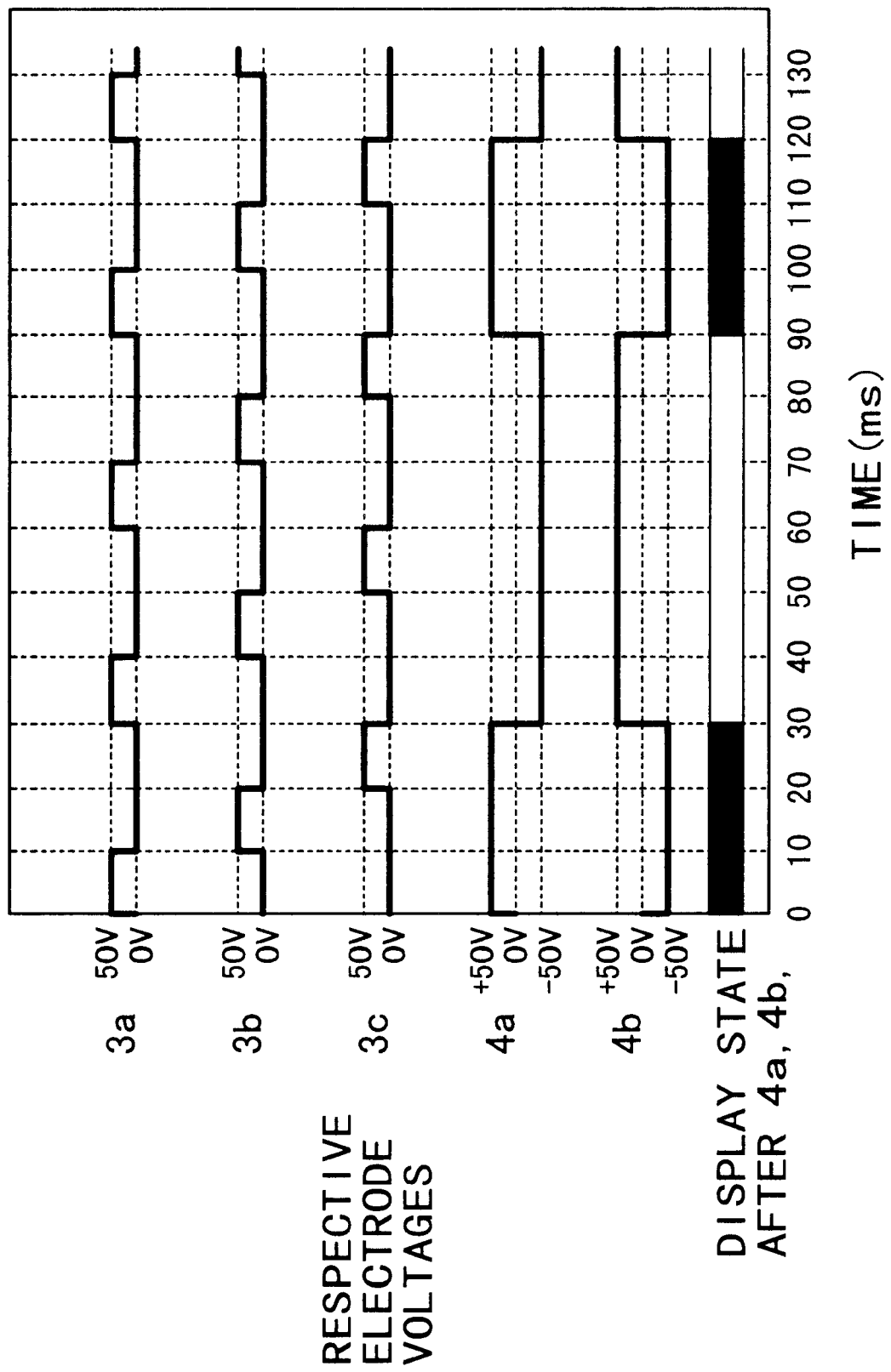
FIGS. 8–12 are time tables showing drive waveforms for driving the pixel member-moving means (conveyer electrodes) and pixel member color-changing means in the first to fifth embodiments of the invention.

The display device D1 thus-prepared was driven by applying appropriate voltages to the conveyer electrodes 3 (3a, 3b, 3c) and rotation electrodes 4 (4a, 4b) according to an appropriate time schedule as shown in a time chart shown in FIG. 8.

Thus, the group electrodes 3a, 3b and 3c were sequentially supplied with rectangular voltages each of 50 volts and 33% duty at a cycle period of 30 ms with a phase shift of 120 deg. (10 ms). As a result, due to interaction between the surface charge of the twisting balls 1 and the electric fields formed by the conveyer electrode groups 3a–3c, the twisting balls 1 on the electrodes 3a–3c were moved in an indicated arrow A direction. As the interior of the guide 2 was substantially filled with the twisting balls, the other twisting balls 1 (not located on the electrode groups 3a–3c) were pushed by the moving twisting balls on the electrode groups 3a–3c and also moved in the same direction, so that all the twisting balls 1 in the guide 2 were circulatively moved along the guide 2.

On the other hand, the rotation electrodes 4a and 4b were supplied with a DC voltage of an arbitrary polarity depending on display data at every 30 ms which was the cycle period of the voltages applied to the electrode groups 3a–3c. As the twisting balls 1 passed by the rotation electrodes, each twisting ball 1 was caused to display a prescribed face depending on a polarity of voltage applied thereto, i.e., a black face toward the electrode 4a in the case of +50 V (4a) and −50 V (4b), and a white face toward the electrode 4a in the case of −50 V (4a) and +50 V (4b). The display state of the individual twisting balls 1 was confirmed by observation through an optical microscope.

By continuing the above operation, a black-white pattern comprising an arbitrary succession of white and black display faces of the twisting balls 1 could be displayed.

In this example, one twisting ball 1 of 100 $\mu$m in diameter was moved for 100 $\mu$m to provide a display at a neighboring site in 30 msec. This may be regarded as a response time of an individual pixel. As a result, a display state along 1 cm of the guide 2 could be exchanged in 3 sec. Incidentally, this may be regarded as the response time of an individual pixel and the display switching time could be changed by changing intervals of voltage signals applied to the moving electrodes 3a–3c.

In this example, individual twisting balls 1 retained their display faces selected when passing by the rotation electrodes 4a and 4b while they passed through the display region shown in FIG. 1A (memory characteristic).

As described above, a linear display device having a display region (10 cm) including ca. 1000 pixels could be driven by 12 (=3×4) conveyer electrodes (3a–3c) and 2 rotation electrodes (4a and 4b), which were much fewer than 1000 +1 or more electrodes for 1000 pixels as required in conventional display devices.

EXAMPLE 2

A display device D2 shown in FIGS. 2A–2C was prepared.

More specifically, the pixel members comprised electrophoretic microcapsule 11 as shown in FIG. 2C, and the pixel member color-changing means 14 comprised a pair of electrophoretic electrodes 14a and 14b disposed to sandwich the guide means 2. Each electrophoretic microcapsule 11 comprised an insulating dark-colored dispersion medium 11a and white electrophoretic particles 11b enclosed within a microcapsule measuring 100 $\mu$m in diameter.

The electrophoretic microcapsules 11 were prepared as follows.

| (Composition A) | |
|---|---|
| Titanium oxide power 11b | 1 g |
| Alphatic hydrocarbon oil ("Isopar H", available from Exxon Co.) | 50 g |
| Sodium alkylsulfosuccinate | 0.5 g |
| Oil Blue | 1 g |

The above ingredients for Composition A, 200 g of water and 3 g of an emulsifier ("Tween 85", available from Kishida Kagaku K.K.) were stirred at 2000 rpm by means of a homogenizer to form an O/W-type emulsion. Into the emulsion, 50 g of 10 wt. %-aqueous gelatin solution and 50 g of 10 wt. %-aqueous gum arabic solution were added, and the pH of the mixture was adjusted to 4–4.3 by dropwise addition of acetic acid aqueous solution under stirring to promote coacervation. Then, the mixture was cooled to 5° C., and 1 ml of 37%-formaldehyde aqueous solution was added thereto to cure the capsule film. The thus-formed microcapsules 11 were washed with water and dried to be recovered.

Then, on a PET film, conveyer electrodes 3 and electrophoretic electrodes 14b were prepared and guide walls 2 were prepared, respectively, similarly as in Example 1, to provide a structure as shown in FIG. 2B (except for an electrode 14a).

Then, the above-prepared electrophoretic particles 11 were mixed in a weight ratio of 1:1 to 1.5:1 with silicone oil containing 0.1 wt. % of sodium alkylsulfosuccinate for imparting a charge to the particles 11, and the mixture was then disposed over the guide walls 2 of the above-prepared structure. Then, another PET film having a counter electrode 14a formed in advance was applied as a ceiling film in alignment with the electrode 14b and bonded to the guide walls 2. The electrophoretic microcapsules 11 fallen outside the guide walls 2 were removed by washing with silicone oil.

Figure 9:
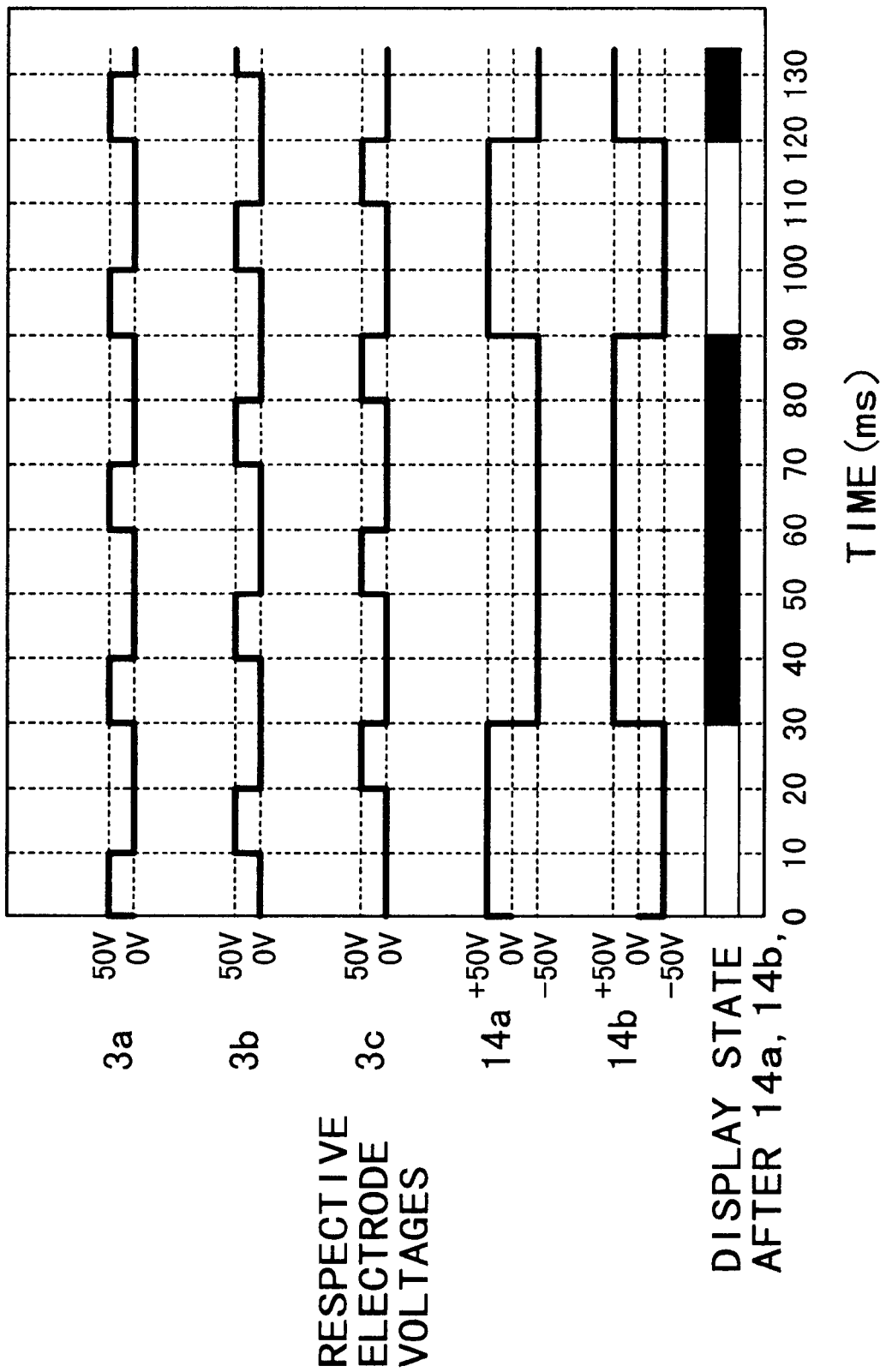

The display device D2 thus-prepared was driven by appropriate voltages to the conveyer electrodes 3 (3a, 3b, 3c) and the electrophoretic electrodes 14a and 14b according to an appropriate time schedule as shown in FIG. 9.

As a result of application of voltages shown in FIG. 9 which were similar in nature to those shown in FIG. 8 to the electrode groups 3a–3c, the electrophoretic microcapsules 11 were moved by the electrode groups 3a–3c and all the electrophoretic microcapsules 11 were moved in an indicated A direction and circulatively within and along the guide 2 in a similar fashion as in Example 1.

On the other hand, the electrophoretic electrodes 14a and 14b were supplied with a DC voltage of an arbitrary polarity depending on display data at every 30 ms which was the cycle period of the voltages applied to the electrode groups 3a–3c. As the electrophoretic microcapsules 11 passed by the electrophoretic electrodes, the titanium oxide particles 11b in each microcapsule 11 were attracted to one inner wall side of the microcapsule 11 depending on a polarity of voltage applied thereto, i.e., toward the electrode 14a to exhibit a white face toward the electrode 14a in the case of +50 V (14a) and −50 V (14b) and toward the electrode 14b to exhibit a blue face toward the electrode 14a in the case of −50 V (14a) and +50 V (14b). The display state of the electrophoretic microcapsules 11 toward the electrode 14a side was confirmed by observation through an optical microscope.

By continuing the above operation, a blue-white pattern comprising an arbitrary succession of white and blue display faces of the electrophoretic microcapsules could be displayed.

Thus, similar display effects as in Example 1 were attained.

EXAMPLE 3

A display device D3 shown in FIGS. 3A–3C was prepared.

More specifically, the pixel members comprised photochromic beads 21 as shown in FIG. 3C, and the pixel member color-changing means 24 comprised a color changing light source 24 disposed opposite to the guide means 2.

Each photochromic bead 21 of ca. 100 μm in diameter comprised a minute spherical core 21b coated with a layer 21a of photochromic material.

The photochromic beads 21 were prepared as follows. Polystyrene balls 21b of 100 μm in diameter were coated with ca. 1 μm-thick tungsten oxide layer 21a on their entire surfaces by RF-magnetron sputtering while vibrating the polystyrene balls on a tray in a vacuum apparatus to form photochromic beads 21 as shown in FIG. 3C.

Then, on a PET film, conveyer electrodes 3 were prepared and guide walls 2 were prepared, respectively, similarly as in Example 1, to provide a structure as shown in FIG. 3B (except for a light source 24).

Then, the above-prepared photochromic beads 21 were mixed in a weight ratio of 1:1 to 1.5:1 with silicone oil containing 0.1 wt. % of sodium alkylsulfosuccinate, and the mixture was then disposed over the guide walls 2 of the above-prepared structure. Then, another PET film on which a blue violet LED 24 (available from Nichia Kagaku K.K.) was applied in advance at a prescribed part was applied as a ceiling film and bonded to the guide walls 2. The photochromic beads 21 fallen outside the guide walls 2 were removed by washing with silicone oil.

Figure 10:
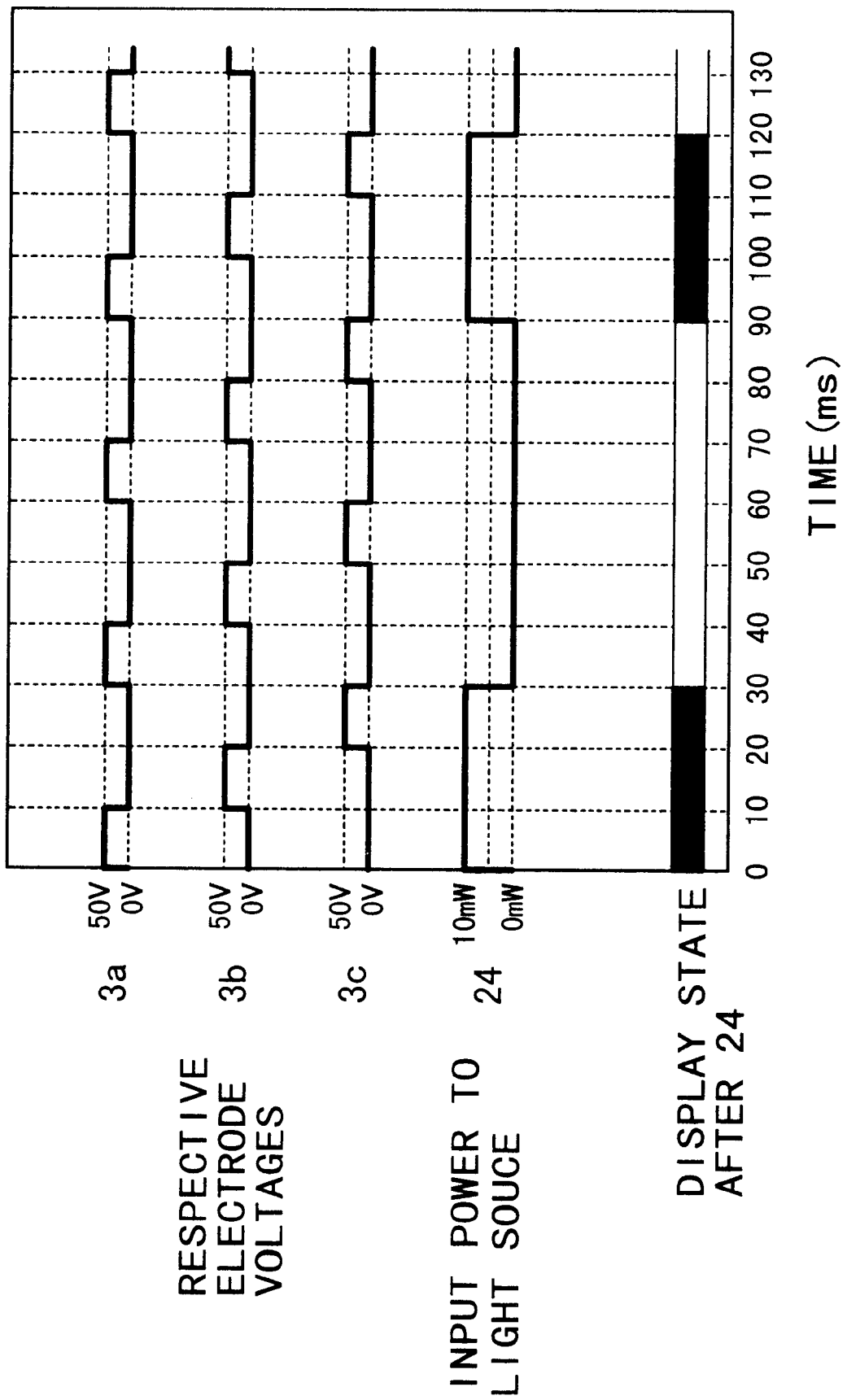

The display device D3 thus-prepared was driven by applying appropriate voltages to the conveyer electrodes 3 (3a, 3b, 3c) and input power to the photochromic light source 24 according to an appropriate time schedule as shown in FIG. 10.

As a result of application of voltages shown in FIG. 10 which were similar in nature to those shown in FIG. 8 to the electrode groups 3a–3c, the photochromic particles 21 were moved by the electrode groups 3a–3c and all the photochromic particles 21 were moved in an indicated arrow A direction and circulatively within and along the guide 2 in a similar fashion as in Example 1.

On the other hand, the photochromic light source 24 was supplied with a DC power only when color change was required depending on display data as shown in FIG. 10 at every 30 ms which, was the cycle period of the voltages applied to the electrode groups 3a–3c. As the photochromic beads 21 passed by the light source 24, individual photochromic beads 21 generated blue color when light was emitted from the source 24 and exhibit a color-less state when light was not emitted from the source 24. The color state of the photochromic beads was confirmed by observation through an optical microscope.

By continuing the above operation, a blue-white pattern comprising an arbitrary succession of white and blue display faces of the photochromic beads 21 could be displayed.

Thus, similar display effects as in Example 1 were attained.

EXAMPLE 4

A display device D4 shown in FIGS. 4A–4C was prepared.

More specifically, the pixel members comprised thermochromic beads 31 as shown in FIG. 4C, and the pixel member color-changing means 34 comprised a heater 34 for color change disposed opposite to the guide means 2. Each thermochromic bead 31 of 100 μm in diameter comprised a minute spherical core 31b coated with a layer 31a of thermochromic material.

The thermochromic beads 31 were prepared as follows. Polystyrene balls 31b of 100 μm in diameter were coated with ca. 1 μm-thick vanadium oxide layer 31a on their entire surfaces by RF-magnetron sputtering while vibrating the polystyrene balls on a tray in a vacuum apparatus to form photochromic beads 31 as shown in FIG. 4C.

Then, on a PET film, conveyer electrodes 3 were prepared and guide walls 2 were prepared, respectively, similarly as in Example 1, and a tantalum film for constituting a heater 34 was formed on the PET film at the position of the rotation electrode 4b in Example 1, to provide a structure as shown in FIG. 4B.

Then, the above-prepared thermochromic beads 31 were mixed in a weight ratio of 1:1 to 1.5:1 with silicone oil containing 0.1 wt. % of sodium alkylsulfosuccinate, and the mixture was then disposed over the guide walls 2 of the above-prepared structure. Then, another PET film was applied as a ceiling film and bonded to the guide walls 2. The thermochromic beads 31 fallen outside the guide walls 2 were removed by washing with silicone oil.

Figure 11:
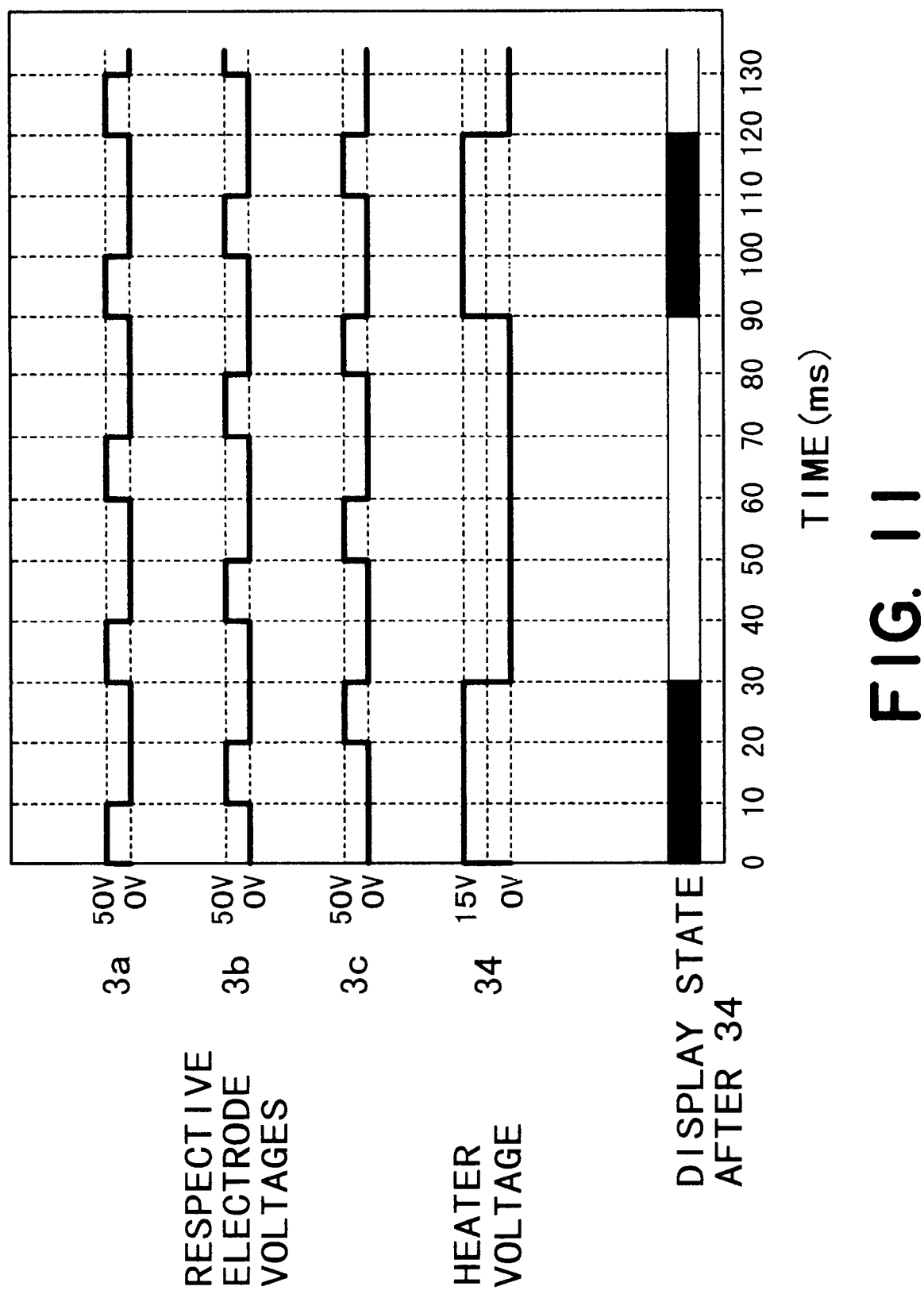

The display device D4 thus-prepared was driven by applying appropriate voltages to the conveyer electrodes 3 (3a, 3b, 3c) and the heater 34 for color changing according to an appropriate time schedule as shown in FIG. 11.

As a result of application of voltages shown in FIG. 11 which were similar in nature to those shown in FIG. 8 to the electrode groups 3a–3c, the thermochromic beads were moved by the electrode groups 3a–3c and all the thermochromic beads 31 were moved in an indicated arrow A direction and circulatively within and along the guide 2 in a similar fashion as in Example 1.

On the other hand, the heater 34 was supplied with a DC voltage only when color change was required as shown in FIG. 11 at every 30 ms which was the cycle period of the voltages applied to the electrode groups 3a–3c. As the thermochromic beads 31 passed by the heater 34, individual thermochromic beads 31 generated black color when heated by the heater 34 and exhibit a color-less state when not heated by the heater 34. The color states of the photochromic beads were confirmed by observation through an optical microscope.

By continuing the above operation, a blue-white pattern comprising an arbitrary succession of white and blue display states of the thermochromic beads 31 could be displayed.

Thus, similar display effects as in Example 1 were attained.

EXAMPLE 5

A display device D5 shown in FIGS. 2A–2C was prepared.

More specifically, the pixel members comprised electrochromic tablets 41 as shown in FIG. 4C, and the pixel member color-changing means 44 comprised a pair of redox electrodes 44a and 44b disposed to sandwich the guide means 2. Each electrochromic tablet or disk 41 of 100 μm in diameter comprised a minute solid electrolyte tablet or disk 41a of which both surfaces were located with a film 41b of an electrochromic material and a transparent electrode film 41c. In this example, the electrochromic films 41b on both sides comprised a reduction coloring material of tungsten oxide, and the electrolyte tablet 41a was colored with titanium oxide in white.

Instead of the structure shown in FIG. 5C, the electrochromic tablet can assume a structure as shown in FIG. 6 comprising minute solid electrolyte tablet 51a of which both surfaces are coated with films 51a of electrochromic material alone. Such electrochromic films 41 (or 51) on both surfaces may comprise an oxidation coloring material and a reduction coloring material, but both films can comprise an identical material in case where the solid electrolyte 41 is opaque as in this specific example.

More specifically, electrochromic tablets 41 used as pixel members in this Example were prepared as follows. Core tablets 41a each having a diameter of 100 μm and a thickness of 40 μm were formed of tantalum oxide as a solid electrolyte. Both surfaces of each tablet 41a was coated with a 1 μm-thick film of tungsten oxide as an electrochromic material by RF-magnetron sputtering and then with a 1 μm-thick transparent electrode (ITO) film 41c also by RF-magnetron sputtering.

Then, on a PET film, conveyer electrodes 3 and an electrochromic electrode 44b were prepared and guide walls 2 (of a reduced thickness of 45 μm corresponding to the tablet 41 thickness) were prepared, respectively, similarly as in Example 1, to provide a structure as shown in FIG. 5B (except for an electrode 44a).

Then, the above-prepared electrochromic tablets 41 were mixed in a weight ratio of 1:1 to 1.5:1 with silicone oil containing 0.1 wt. % of sodium alkylsulfosuccinate, and the mixture was then disposed over the guide walls 2 of the above-prepared structure. Then, another PET film having a counter electrode 44a formed in advance was applied as a ceiling film in alignment with the electrode 44b and bonded to the guide walls 2. The electrochromic tablets 41 fallen outside the guide walls 2 were removed by washing with silicone oil.

Figure 12:
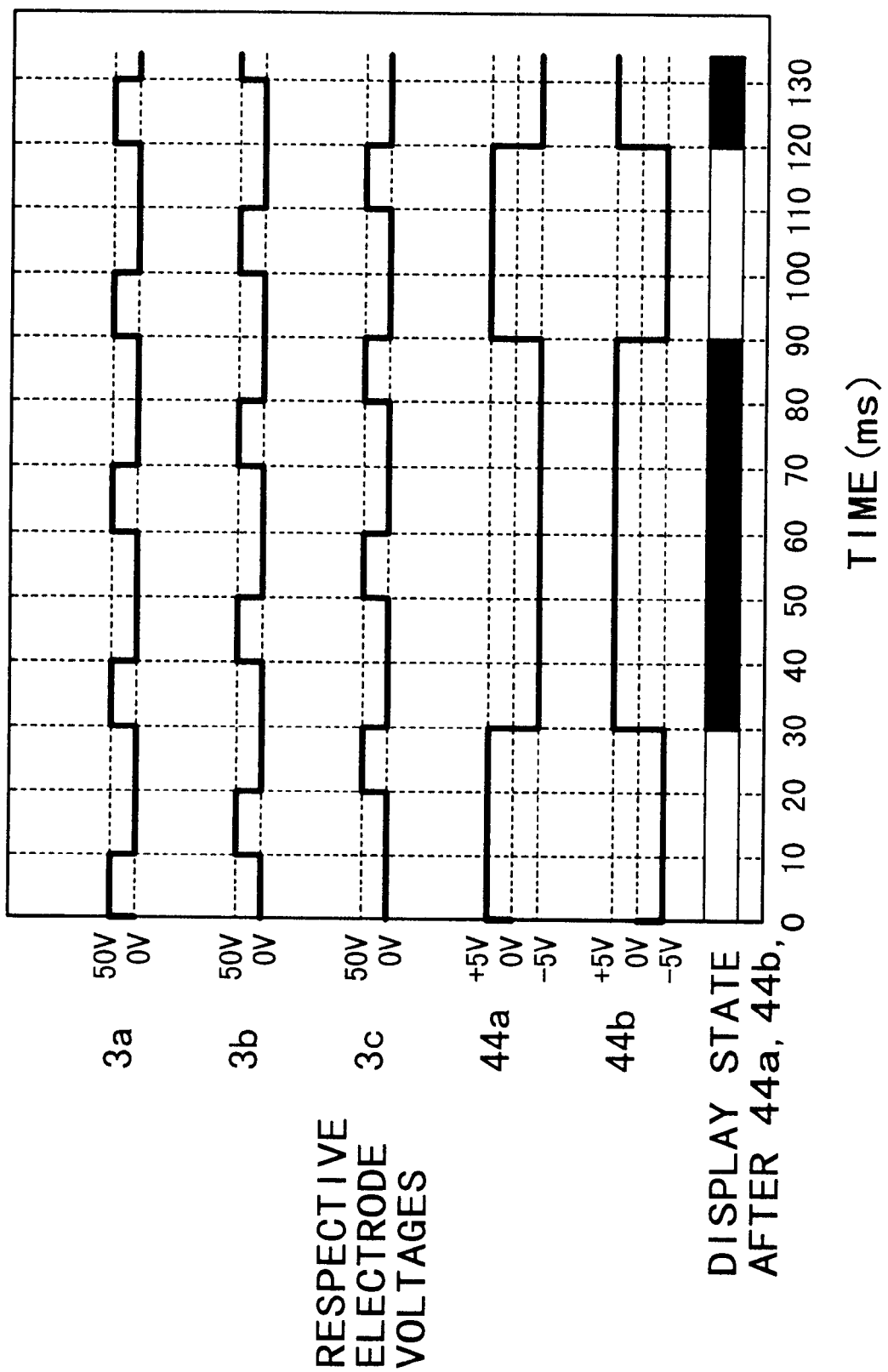

The display device D5 thus-prepared was driven by applying appropriate voltages to the conveyer electrodes 3 (3a, 3b, 3c) and the electrochromic electrodes 44a and 44b according to an appropriate time schedule as shown in FIG. 12.

As a result of application of voltages shown in FIG. 12 which were similar in nature to those shown in FIG. 8 to the electrode groups 3a–3c, the electrochromic tablets 41 were moved by the electrode groups 3a–3c and all the electrochromic tablets 41 were moved in an indicated arrow A direction and circulatively within and along the guide 2 in a similar fashion as in Example 1.

On the other hand, the electrochromic electrodes 44a and 44b were supplied with a DC voltage of an arbitrary polarity depending on display data at every 30 ms which was the cycle period of the voltages applied to the electrode groups 3a–3c. As the electrochromic tablets 41 passed by the redox electrodes 44a and 44b, each tablet 41 caused electrochromic reactions, and the tungsten oxide film 41b facing the redox electrode 44a was oxidized to display a colorless state toward the electrode 44a when the electrode 44a was supplied with +5 V (in contrast with −5 V to the electrode 44b) and reduced to display a blue color toward the electrode 44a when the electrode 44a was supplied with −5 V (in contrast with +5 V to the electrode 44b). The display states of the tablets 41 were confirmed by observation through an optical microscope.

By continuing the above operation, a blue-white pattern comprising an arbitrary succession of white and blue display faces of the electrochromic tablets 41 could be displayed.

Thus, similar display effects as in Example 1 were attained.

As described above, the present invention provide a display device including moving pixel members. As a result, each pixel does not require an electrode for display, so that the number of drive electrodes can be remarkably reduced compared with conventional display devices requiring one or more electrodes for each pixel, and complicated wiring operation and a cost increase accompanying it can be alleviated.

Further, as the number of drive electrodes and accompanying drive parts can be reduced, the display device can be formed in a smaller thickness so that a book-form display apparatus as mentioned above can be provided by binding a plurality of such display devices disposed in a stack form along an edge.

Further, each pixel member does not require a drive electrode, and the entire structure is simple, the display device can be constituted as a flexible display device by forming the guide means of a flexible material, such as plastic.

What is claimed is:

1. A display device, comprising:

a plurality of pixel members disposed in succession, an endless guide means holding the plurality of pixel members movably therein;

a pixel member-moving means disposed at a part of said guide means for circulating said pixel members along said guide means; and a pixel member color-changing means disposed at a part of said guide means for causing a color change of individual pixel members, wherein the colors of respective pixel members are changed by said pixel member color-changing means while being circulated by said pixel member-moving means to effect a display, and each of said pixel members has at least two surface portions having mutually different permittivities and colors, and said pixel member color-changing means comprises electrodes disposed to face said guide means for controlling a rotation of said pixel members depending on a polarity of voltage applied therebetween.

2. A display device according to claim 1, wherein said pixel member-moving means comprises a plurality of electrodes disposed to face said guide means for receiving voltages of varying phases to generate an electrostatic attraction force or repulsion force between said pixel members and said electrodes.

3. A display device according to claim 1, wherein said pixel member-moving means comprises a plurality of electrodes disposed to face said guide means for receiving voltages of varying phases to generate a magnetic attraction force or repulsion force between said pixel members and said electrodes.

4. A display device according to claim 1, wherein said pixel member-moving means comprises a piezoelectric film disposed along said guide means for causing a surface elastic wave for moving said pixel members along said guide means.

5. A display device according to claim 1, wherein said guide means contains a lubricant in addition to said pixel members.

6. A display device according to claim 1, wherein said guide means has a shape of a groove or a tube.

7. A display device, comprising:

a plurality of pixel members disposed in succession, an endless guide means holding the plurality of pixel members movably therein;

a pixel member-moving means disposed at a part of said guide means for circulating said pixel members along said guide means; and a pixel member color-changing means disposed at a part of said guide means for causing a color change of individual pixel members, wherein the colors of respective pixel members are changed by said pixel member color-changing means while being circulated by said pixel member-moving means to effect a display, and each of said pixel members comprises a microcapsule in which a colored dispersion medium and electrophoretic particles are enclosed, and said pixel member color-changing means comprises electrodes disposed to face said guide means for controlling a place of accumulation of the electrophoretic particles within the microcapsule depending on a polarity of voltage applied therebetween.

8. A display device, comprising:

a plurality of pixel members disposed in succession, an endless guide means holding the plurality of pixel members movably therein;

a pixel member-moving means disposed at a part of said guide means for circulating said pixel members along said guide means; and a pixel member color-changing means disposed at a part of said guide means for causing a color change of individual pixel members, wherein the colors of respective pixel members are changed by said pixel member color-changing means while being circulated by said pixel member-moving means to effect a display, and each of said pixel members comprises a microcapsule in which a colored dispersion medium and magnetophoretic particles are enclosed, and said pixel member color-changing means comprises electrodes disposed to face said guide means for controlling a place of accumulation of the magnetophoretic particles within the microcapsule depending on a polarity of voltage applied therebetween.

9. A display device, comprising:

a plurality of pixel members disposed in succession, an endless guide means holding the plurality of pixel members movably therein;

a pixel member-moving means disposed at a part of said guide means for circulating said pixel members along said guide means; and a pixel member color-changing means disposed at a part of said guide means for causing a color change of individual pixel members, wherein the colors of respective pixel members are changed by said pixel member color-changing means while being circulated by said pixel member-moving means to effect a display, and each of said pixel members comprises a coating of a photochromic material, and said pixel member color-changing means comprises a light source disposed to face said guide means for causing photochromism of said pixel members.

10. A display device, comprising:

a plurality of pixel members disposed in succession, an endless guide means holding the plurality of pixel members movably therein;

a pixel member-moving means disposed at a part of said guide means for circulating said pixel members along said guide means; and a pixel member color-changing means disposed at a part of said guide means for causing a color change of individual pixel members, wherein the colors of respective pixel members are changed by said pixel member color-changing means while being circulated by said pixel member-moving means to effect a display, and each of said pixel members comprises a coating of a thermochromic material, and said pixel member color-changing means comprises a heater disposed to face said guide means for causing thermochromism of said pixel members.

11. A display device, comprising:

a plurality of pixel members disposed in succession, an endless guide means holding the plurality of pixel members movably therein;

a pixel member-moving means disposed at a part of said guide means for circulating said pixel members along said guide means; and a pixel member color-changing means disposed at a part of said guide means for causing a color change of individual pixel members, wherein the colors of respective pixel members are changed by said pixel member color-changing means while being circulated by said pixel member-moving means to effect a display, and each of said pixel members comprises an electrochromic cell including an electrochromic material, and said pixel member color-changing means comprises electrodes disposed to face said guide means for causing electrochromism of the electrochromic material.

* * * * *

UNITED STATES PATENT AND TRADEMARK OFFICE
CERTIFICATE OF CORRECTION

PATENT NO.     : 6,603,457 B1
DATED          : August 5, 2003
INVENTOR(S)    : Masahiro Nakanishi It is certified that error appears in the above-identified patent and that said Letters Patent is hereby corrected as shown below:

Column 2,
Line 64, "terms" should read -- termed --.

Column 4,
Line 21, "a" should be deleted.

Column 9,
Line 40, "which," should read -- which --.

Signed and Sealed this

Second Day of December, 2003

JAMES E. ROGAN
*Director of the United States Patent and Trademark Office*